United States Patent
Lewenz et al.

(10) Patent No.: US 8,661,748 B2
(45) Date of Patent: Mar. 4, 2014

(54) BALLASTED ROOF AND GROUND MOUNTED SOLAR PANEL RACKING SYSTEM

(76) Inventors: David B. P. Lewenz, St. Petersburg, FL (US); Michael Joseph Moulder, Wilmington, DE (US)

(*) Notice: Subject to any disclaimer, the term of this patent is extended or adjusted under 35 U.S.C. 154(b) by 0 days.

(21) Appl. No.: 13/365,168

(22) Filed: Feb. 2, 2012

(65) Prior Publication Data

US 2013/0200016 A1 Aug. 8, 2013

(51) Int. Cl.
| E04D 13/18 | (2006.01) |
| E04H 14/00 | (2006.01) |
| E04B 1/00 | (2006.01) |
| E04G 21/00 | (2006.01) |
| E04G 23/00 | (2006.01) |

(52) U.S. Cl.
USPC ..................... 52/173.3; 52/745.19

(58) Field of Classification Search
USPC ............ 52/20, 222, 173.3, 251, 586.1, 586.2, 52/582.1, 656.1, 665, 726.2, 745.19; 136/244, 251, 291; 126/623, 704, 621, 126/622; 257/433
See application file for complete search history.

(56) References Cited

U.S. PATENT DOCUMENTS

| 4,058,111 A | 11/1977 | Wendel |
| 4,226,256 A * | 10/1980 | Hawley ........................ 136/244 |
| 4,292,957 A | 10/1981 | Golder |
| 4,300,537 A | 11/1981 | Davis |
| 4,306,544 A | 12/1981 | Clemens |
| 4,378,006 A | 3/1983 | Hawley |
| 4,421,943 A * | 12/1983 | Withjack ...................... 136/246 |
| 4,440,861 A | 4/1984 | McCarthy |
| 4,716,882 A | 1/1988 | Ishida |
| 4,832,001 A | 5/1989 | Baer |
| 5,125,608 A | 6/1992 | McMaster et al. |

(Continued)

FOREIGN PATENT DOCUMENTS

| DE | 200 08 509 | 8/2000 |
| DE | 20120983 | 4/2002 |

(Continued)

OTHER PUBLICATIONS

Roecker, Christian, "New Mounting Systems for PV on Buildings", The 2nd World Solar Electric Buildings Conference, Sydney Mar. 8-10, 2000, pp. 1-8.

(Continued)

*Primary Examiner* — William Gilbert
*Assistant Examiner* — Kyle Walraed-Sullivan
(74) *Attorney, Agent, or Firm* — Leason Ellis LLP

(57) ABSTRACT

A light weight ballasted solar racking system has light ballasted weight loads and is easy and fast to install. The racking system may be used in roof or ground mount applications to mount thin film and frameless solar modules. The racking system physically attaches to the solar panel at the manufactured mounting holes with a set of struts that then attach to a ballast tray that holds the system in place. A set of struts may determine the degree of angle from about 5 to about 35 degrees, for example. The front of the ballast tray has an air pass way of about 3-5 inches, while the back of the system has about 8-12 inches of space for an air pass way. Multiple racking systems may be linked together, resulting in the need for less ballast weight for each racking system.

10 Claims, 4 Drawing Sheets

(56) References Cited

U.S. PATENT DOCUMENTS

| | | | |
|---|---|---|---|
| 5,139,010 A | 8/1992 | Borgens, Jr. et al. | |
| 5,232,187 A | 8/1993 | O'Farrell et al. | |
| 5,289,999 A | 3/1994 | Naujeck | |
| 5,505,788 A | 4/1996 | Dinwoodie | |
| 5,768,831 A | 6/1998 | Melchior | |
| 5,953,869 A | 9/1999 | Balfour et al. | |
| 6,105,316 A | 8/2000 | Bottger et al. | |
| 6,105,317 A | 8/2000 | Tomiuchi et al. | |
| 6,346,669 B1 | 2/2002 | Itoh | |
| 6,360,491 B1 | 3/2002 | Ullman | |
| 6,370,828 B1 | 4/2002 | Genschorek | |
| 6,534,702 B1 | 3/2003 | Makita et al. | |
| D496,248 S | 9/2004 | Liebendorfer | |
| D496,249 S | 9/2004 | Liebendorfer | |
| 6,968,654 B2 | 11/2005 | Moulder et al. | |
| 7,260,918 B2 | 8/2007 | Liebendorfer | |
| 7,434,362 B2 | 10/2008 | Liebendorfer | |
| 7,600,349 B2 | 10/2009 | Liebendorfer | |
| 7,748,175 B2 | 7/2010 | Liebendorfer | |
| 7,766,292 B2 | 8/2010 | Liebendorfer | |
| 7,832,157 B2 * | 11/2010 | Cinnamon | 52/173.3 |
| 7,849,849 B2 * | 12/2010 | Genschorek | 126/704 |
| 8,128,044 B2 | 3/2012 | Liebendorfer | |
| D671,885 S * | 12/2012 | Steinau | D13/102 |
| 2001/0008143 A1 * | 7/2001 | Sasaoka et al. | 136/244 |
| 2002/0092246 A1 | 7/2002 | Graham | |
| 2003/0070368 A1 | 4/2003 | Shingleton | |
| 2004/0250491 A1 | 12/2004 | Diaz et al. | |
| 2004/0261334 A1 | 12/2004 | Liebendorfer et al. | |
| 2005/0166955 A1 * | 8/2005 | Nath et al. | 136/251 |
| 2007/0102036 A1 | 5/2007 | Cinnamon | |
| 2009/0134291 A1 * | 5/2009 | Meier et al. | 248/222.14 |
| 2009/0232616 A1 | 9/2009 | Sekreta | |
| 2010/0269447 A1 | 10/2010 | Schuit et al. | |
| 2010/0319277 A1 | 12/2010 | Suarez et al. | |
| 2012/0036799 A1 * | 2/2012 | Kneip et al. | 52/173.3 |
| 2012/0048351 A1 | 3/2012 | Rizzo | |

FOREIGN PATENT DOCUMENTS

| | | |
|---|---|---|
| DE | 29910538 | 10/2006 |
| EP | 0 857 296 | 8/1998 |
| JP | 2000208803 | 7/2000 |
| NL | 1020947 | 6/2002 |
| WO | WO 03-038910 | 5/2003 |

OTHER PUBLICATIONS

Hacker, Rod, Ruyssevelt Paul, Munro Donna, "Activity Leader and Information Dissemination", Crown, First published 2002.
Elektriciteit uit zonlicht, Feb. 7, 1996, http://www.ode.be.
Roecker, C. et al. "Demosite & Demosite Flat Roofs in IEA Task VII(PVPS)" Ecole Polytechnique Fédérale de Lausanne (EPFL), Laboratoire d'Energie Solaire et de Physique du Bâtiment.
Installation Manual for ConSole, from Econergy International B.V., 2007, available at www.e-conergy.com.

* cited by examiner

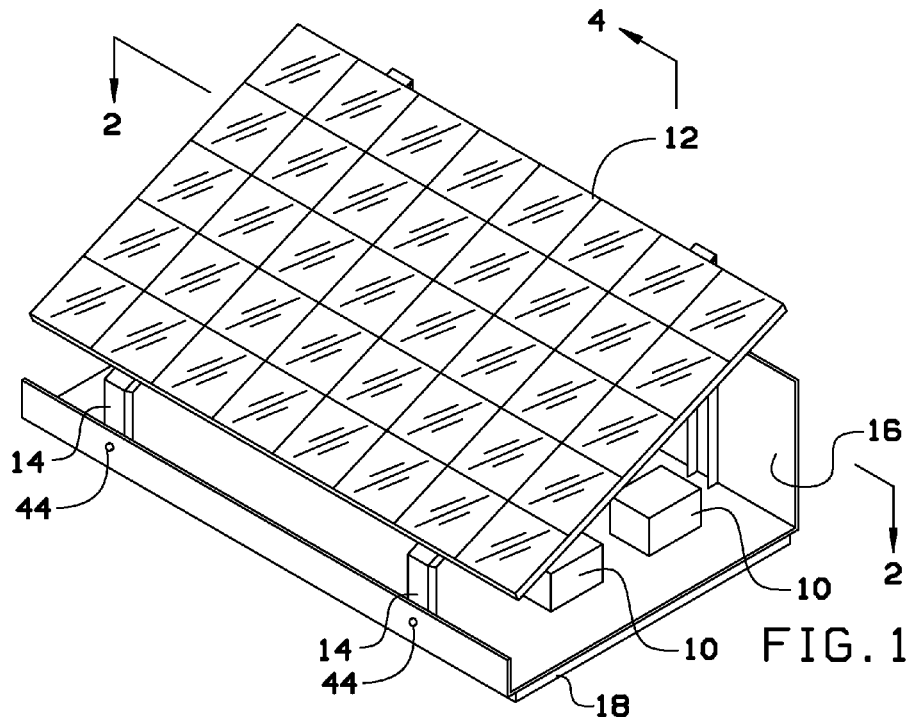
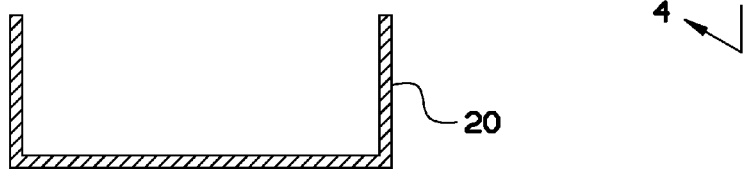
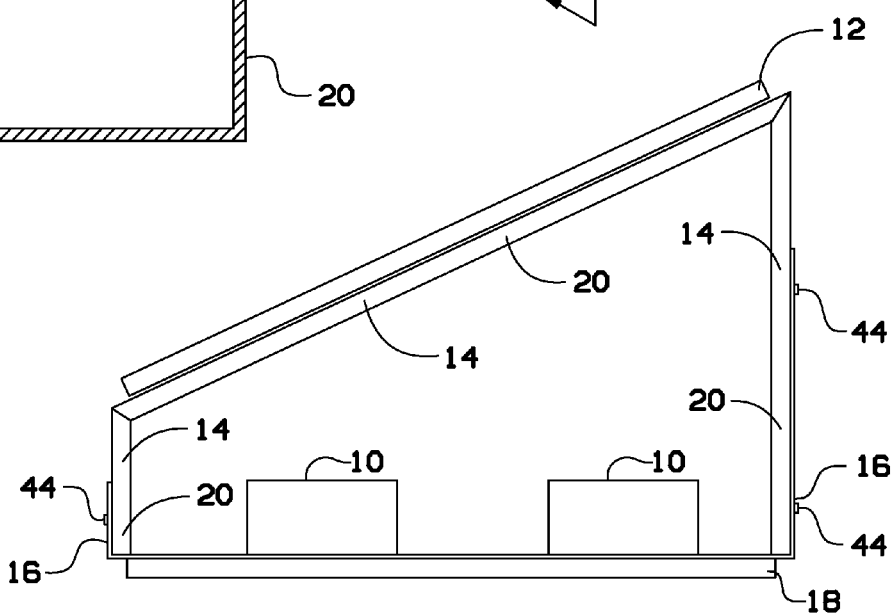

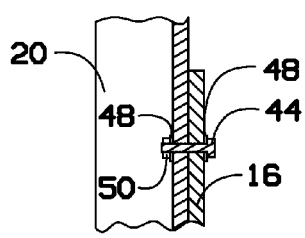
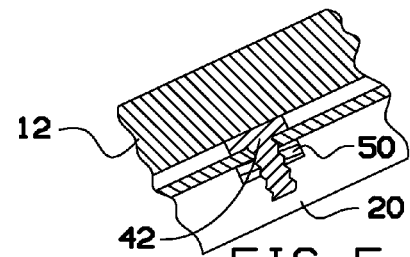
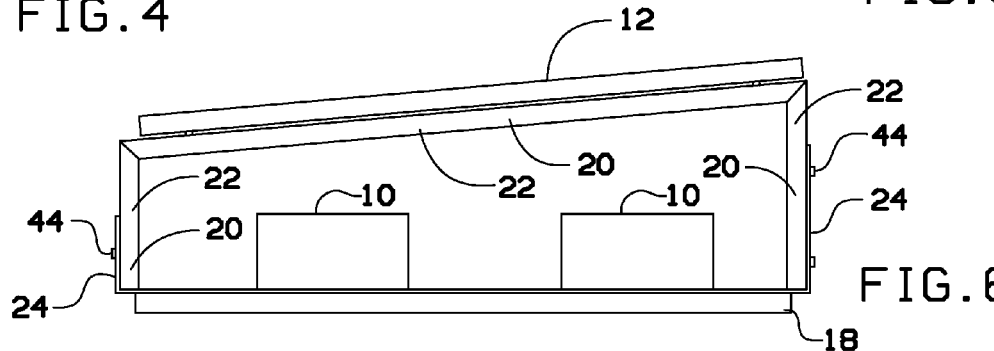
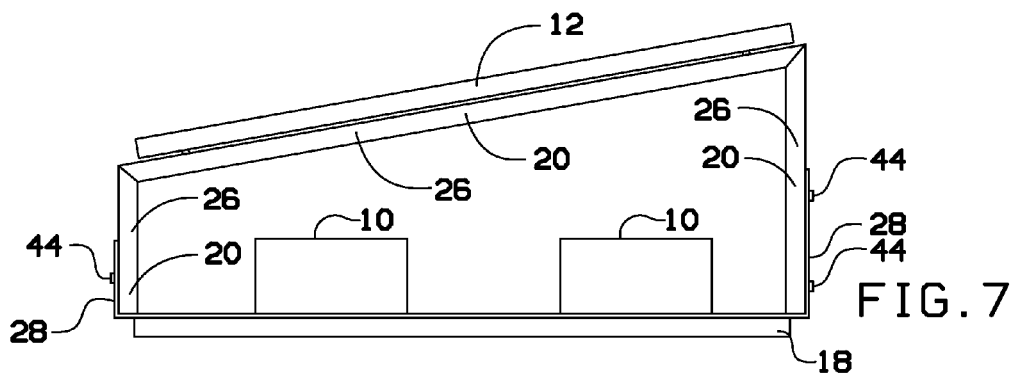
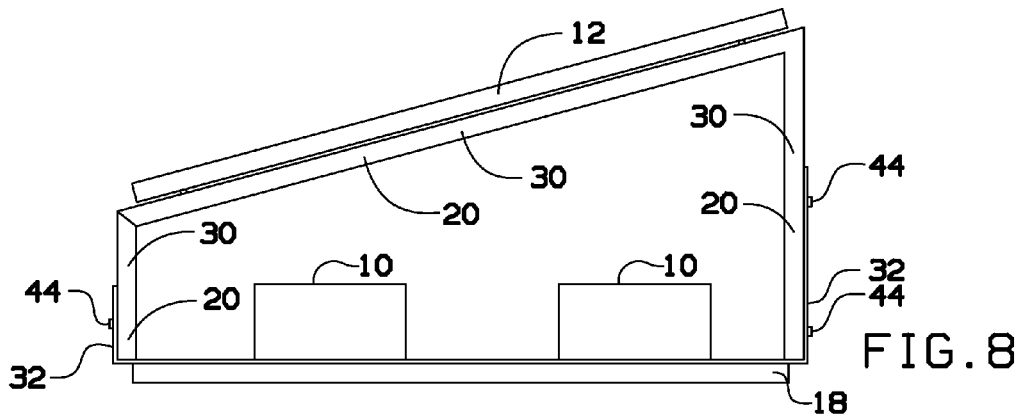

BALLASTED ROOF AND GROUND MOUNTED SOLAR PANEL RACKING SYSTEM

BACKGROUND OF THE INVENTION

The present invention relates to solar panel racking systems and, more particularly, to a ballasted roof or ground mounted solar panel racking system.

Conventional solar panel racking systems attach directly to the roof or use a concrete curb system that sits on the roof and can potentially damage the roof surface. These conventional mounting systems are often time consuming to build and install, often resulting in leaks in the roof surface over time.

As can be seen, there is a need for an improved solar panel racking system.

SUMMARY OF THE INVENTION

In one aspect of the present invention, a racking system for a solar panel comprises a ballast pan having a base and first and second side extending from each side of the base; a mounting strut extending along the first side of the ballast pan, running at an angle relative to the base of the ballast pan, and extending along the second side of the ballast pan; and one or more ballast blocks disposed on the ballast pan.

In another aspect of the present invention, a racking system for a solar panel comprises a ballast pan having a base and first and second side extending from each side of the base; a mounting strut extending along the first side of the ballast pan, running at an angle relative to the base of the ballast pan, and extending along the second side of the ballast pan; one or more ballast blocks disposed on the ballast pan; a foam board disposed under the ballast pan; and a solar module attachment fastener adapted to connect the mounting strut to a solar module.

In a further aspect of the present invention, a method for mounting a solar module on a surface comprises disposing a ballast pan, having a base and first and second side extending from each side of the base, on the surface; extending a mounting strut along the first side of the ballast pan, running at an angle relative to the base of the ballast pan, and extending along the second side of the ballast pan; securing the mounting strut to the first and second sides of the ballast pan; placing one or more ballast blocks on the ballast pan; and attaching the solar module to the mounting strut.

These and other features, aspects and advantages of the present invention will become better understood with reference to the following drawings, description and claims.

BRIEF DESCRIPTION OF THE DRAWINGS

FIG. 1 is a perspective view of a racking system, in use to mount a solar panel, according to an exemplary embodiment of the present invention;

FIG. 2 is a cross-sectional view taken along line 2-2 of FIG. 1;

FIG. 3 is a side view of the racking system of FIG. 1 in a first angled configuration;

FIG. 4 is a cross-sectional view taken along line 4-4 of FIG. 1;

FIG. 5 is a close-up view of a solar panel attachment fastener according to an exemplary embodiment of the present invention;

FIG. 6 is a side view of the racking system of FIG. 1 in a second angled configuration;

FIG. 7 is a side view of the racking system of FIG. 1 in a third angled configuration;

FIG. 8 is a side view of the racking system of FIG. 1 in a fourth angled configuration;

DETAILED DESCRIPTION OF THE INVENTION

Figure 9:
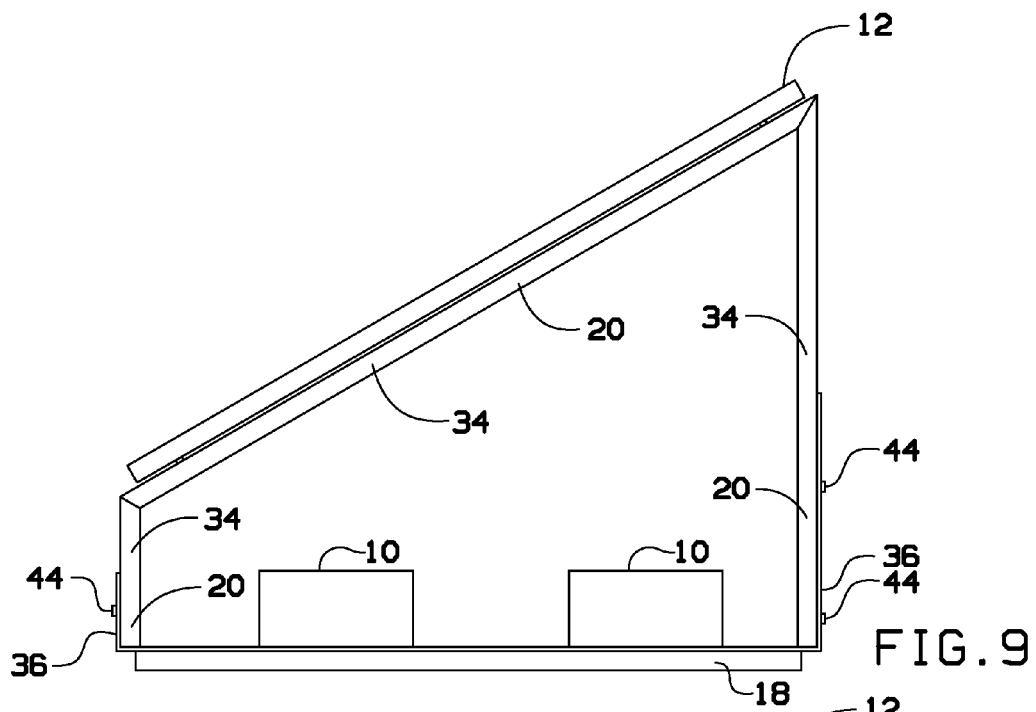
FIG. 9 is a side view of the racking system of FIG. 1 in a fifth angled configuration.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a light weight ballasted solar racking system that has light ballasted weight loads and is easy and fast to install. The racking system of the present invention may be used in roof or ground mount applications to mount thin film and frameless solar modules. The racking system physically attaches to the solar panel at the manufactured mounting holes with a set of struts that then attach to a ballast tray that holds the system in place. A set of struts may determine the degree of angle from about 5 to about 35 degrees, for example. The front of the ballast tray has an air pass way of about 3-5 inches, while the back of the system has about 8-12 inches of space for an air pass way. Multiple racking systems may be linked together, resulting in the need for less ballast weight for each racking system.

Referring now to FIGS. 1 through 5, a racking system may include a ballast pan 16 shaped in a U-shape, where the base of the U-shape is adapted to rest on a roof of on the ground, for example. A front side of the U-shape may be shorter than a back side of the U-shape. The base of the ballast pan 16 may be adapted to hold one or more ballast blocks 10.

The ballast pan 16 may be fabricated from aluminum, although other materials, such as steel, stainless steel, and plastic, may be used. The ballast pan 16 may be made in various thicknesses. For an aluminum ballast pan, for example, 0.063 gauge aluminum may be used. The ballast pan 16 may be fabricated from a flat piece of material that is sheared to size and bent to shape. The sides of the ballast pan 16 may extend generally perpendicular from the base of the ballast pan 16. The footprint of the ballast pan 16 may be the same or larger than the footprint of a solar panel 12 mounted on the racking system.

The ballast pan 16 may include a hat channel, for example, bent from the same material and attached to the bottom to accommodate installations on the ground. Hat channels can be fabricated in varying heights, depending on system mounting concerns.

A foam board 18 may be disposed on the bottom of the ballast pan 16 to separate the metal ballast pan 16 from roofing material. The foam board 18 may also promote proper water drainage of the racking system when installed on roofs.

The foam board 18 can be utilized in varying thickness, rigidity, and resiliency to accommodate different roof concerns.

A mounting strut 14 may extend generally perpendicular from the base of the ballast pan 16 at one side of the ballast pan 16, may be bent at an appropriate angle (relative to the roof) and may be further bent to extend to the other side of the ballast pan 16, again meeting the ballast pan in a generally perpendicular fashion. The mounting strut may be attached to the ballast pan 16 by using a bolt 44, nut 50 and star washer 48. Other attachment mechanisms, such as sheet metal screws, may be used in place of the nut 50 and bolt 44.

The mounting strut 14 may be made of the same material as the ballast pan 16. In some embodiments, the mounting strut 14 may be a material different from the material of the ballast pan 16. The mounting strut 14 may be made from flat sheets of aluminum, for example. The sheets may be punched, notched and bent to the proper angle and size. The final bends which determine the solar module mounting angle may be mechanically secured with a sleet metal screw or rivet, or may be welded to maintain the structural integrity.

From one to four, or more, mounting struts 14 may be used on each racking system. As shown in FIG. 1, two mounting struts 14 may be used.

The mounting strut 14 may contain two punched holes which align with the solar module manufacturer supplied frame mounting holes to secure the struts 14 to the solar module 12 using four solar module attachment fasteners 42, for example. Other mechanisms may be used to attach the solar module 12 to the mounting struts 14.

Figure 10:
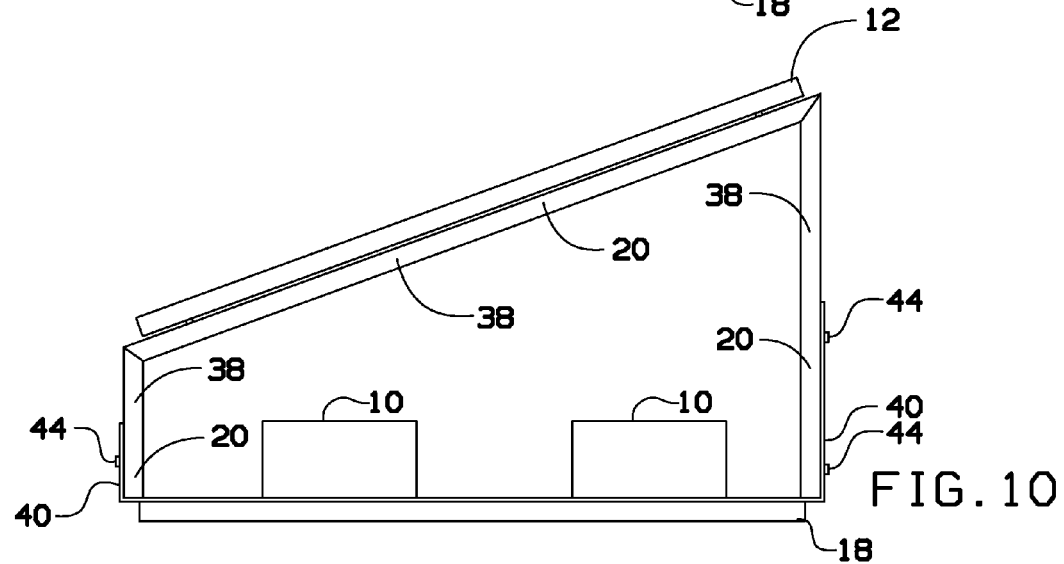
FIG. 10 is a side view of the racking system of FIG. 1 in a sixth angled configuration.

The struts 14 and ballast pan 16 may be designed, for example, to provide an angle of about 25 degrees relative to the mounting surface (such as the ground or a roof). Referring to FIG. 6, a 5 degree mounting strut 22 and a 5 degree ballast pan 24 may provide a 5 degree angle for the solar module 12. Referring to FIG. 7, a 10 degree mounting strut 26 and a 10 degree ballast pan 28 may provide a 10 degree angle for the solar module 12. Referring to FIG. 8, a 15 degree mounting strut 30 and a 15 degree ballast pan 32 may provide a 15 degree angle for the solar module 12. Referring to FIG. 9, a 20 degree mounting strut 34 and a 20 degree ballast pan 36 may provide a 20 degree angle for the solar module 12. Referring to FIG. 10, a 30 degree mounting strut 38 and a 30 degree ballast pan 40 may provide a 30 degree angle for the solar module 12. Other angles may be envisioned within the scope of the present invention by changing the sizes of the struts and ballast pan. In some embodiments, the same size and shape ballast pan may be used with different sized struts to vary the angle of the solar module 12.

Figure 11:
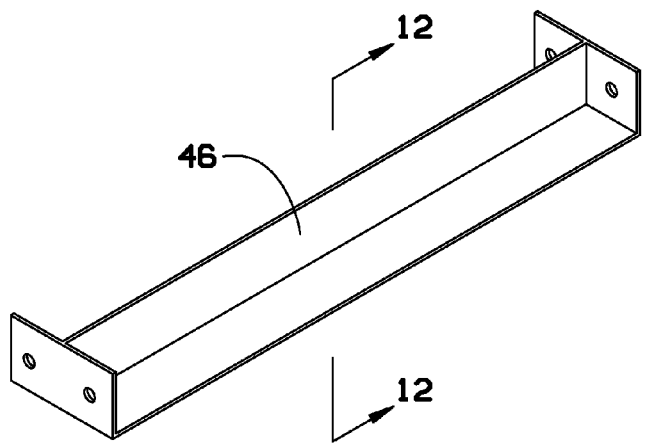
FIG. 11 is a perspective view of an interconnection bar used to connect adjacent racking systems together.
Figure 12:
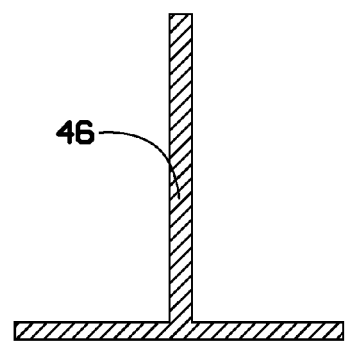
FIG. 12 is a cross-sectional view taken along line 12-12 of FIG. 11.
Figure 13:
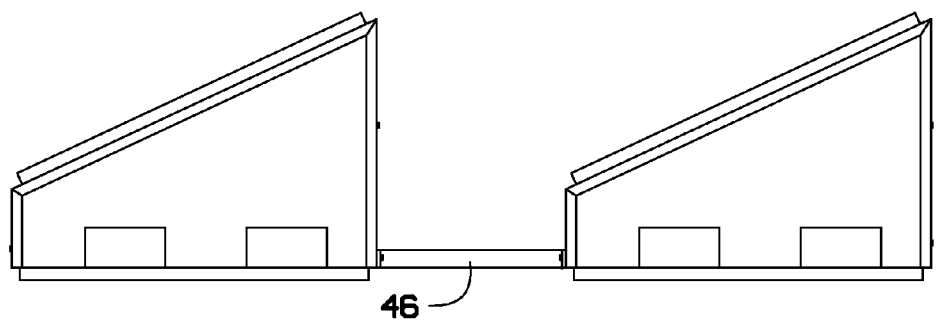
FIG. 13 is a side view of two racking systems connected together according to an exemplary embodiment of the present invention.

Referring now to FIGS. 11 through 13, multiple racking systems may be interconnected with one or more interconnection bars 46. The interconnection bars 46 may be L-shaped or T-shaped, for example. The interconnection bars 46 may be made of various lengths and may be installed in the space between the rows of ballast pans, connecting one ballast pan to a ballast pan in an adjacent row. The interconnection bars 46 may also be used to join racking systems side-by-side. Various connection mechanisms may be used to attach the interconnection bars 46 to the ballast pans.

Proper electrical ground may be provided for the racking systems of the present invention. For example, a grounding washers and grounding clips may be used to provide a continuous grounding path for each or multiple rows of ballast pans. Other electrical grounding mechanisms may be used to comply with national or local electric codes.

It should be understood, of course, that the foregoing relates to exemplary embodiments of the invention and that modifications may be made without departing from the spirit and scope of the invention as set forth in the following claims.

What is claimed is:

1. A racking system for a solar panel comprising:
   a ballast pan having a base and first and second sides extending from opposite ends of the base, wherein the second side extends higher than the first side;
   a mounting strut having a first section extending along the first side of the ballast pan such that the first side of the ballast pan extends along at least a quarter of the length of the first section of the strut, a second section running at an angle relative to the base of the ballast pan, and a third section extending along the second side of the ballast pan such that the second side of the ballast pan extends along at least a quarter of the length of the third section of the strut, wherein a first gap is defined between an end of the first side of the ballast pan and an end portion of the second section of the strut proximate the first section and a second gap is defined between an end of the second side of the ballast pan and an end portion of the second section of the strut proximate the third section such that the second gap is larger than the first gap; and
   one or more ballast blocks disposed on the ballast pan.

2. The racking system of claim 1, further comprising a foam board disposed under the ballast pan.

3. The racking system of claim 1, further comprising a solar module attachment fastener adapted to connect the mounting strut to a solar module.

4. The racking system of claim 1, further comprising an interconnection bar attached to the ballast pan of a first racking system and the ballast pan of a second, adjacent racking system.

5. The racking system of claim 1, wherein the angle is from about 5 degrees to about 35 degrees.

6. A racking system for a solar panel comprising:
   a ballast pan having a base and first and second sides extending from opposite ends of the base, wherein the second side extends higher than the first side;
   a mounting strut having a first section extending along the first side of the ballast pan such that the first side of the ballast pan extends along at least a quarter of the length of the first section of the strut, a second section running at an angle relative to the base of the ballast pan, and a third section extending along the second side of the ballast pan such that the second side of the ballast pan extends along at least a quarter of the length of the third section of the strut, wherein a first gap is defined between an end of the first side of the ballast pan and an end portion of the second section of the strut proximate the first section and a second gap is defined between an end of the second side of the ballast pan and an end portion of the second section of the strut proximate the third section such that the second gap is larger than the first gap;
   one or more ballast blocks disposed on the ballast pan;
   a foam board disposed under the ballast pan; and
   a solar module attachment fastener adapted to connect the mounting strut to a solar module.

7. The racking system of claim 6, further comprising an interconnection bar attached to the ballast pan of a first racking system and the ballast pan of a second, adjacent racking system.

8. The racking system of claim 6, wherein the angle is from about 5 degrees to about 35 degrees.

9. A method for mounting a solar module on a surface, the method comprising:

disposing a ballast pan on the surface, the ballast pan having a base and first and second sides extending from opposite ends of the base, wherein the second side extends higher than the first side ;

providing a mounting strut having a first section extending along the first side of the ballast pan such that the first side of the ballast pan extends along at least a quarter of the length of the first section of the strut, a second section running at an angle relative to the base of the ballast pan, and a third section extending along the second side of the ballast pan such that the second side of the ballast pan extends along at least a quarter of the length of the third section of the strut, wherein a first gap is defined between an end of the first side of the ballast pan and an end portion of the second section of the strut proximate the first section and a second gap is defined between an end of the second side of the ballast pan and an end portion of the second section of the strut proximate the third section such that the second gap is larger than the first gap;

securing the mounting strut to the first and second sides of the ballast pan;

placing one or more ballast blocks on the ballast pan; and attaching the solar module to the mounting strut.

10. The method of claim 9, further comprising adjusting the size of the mounting strut such that a predetermined angle, with respect to the ballast base, is formed to mount the solar module thereupon.

\* \* \* \* \*